June 9, 1931.                A. L. GROSS                1,809,410
                            JUICE EXTRACTOR
                          Filed April 15, 1929
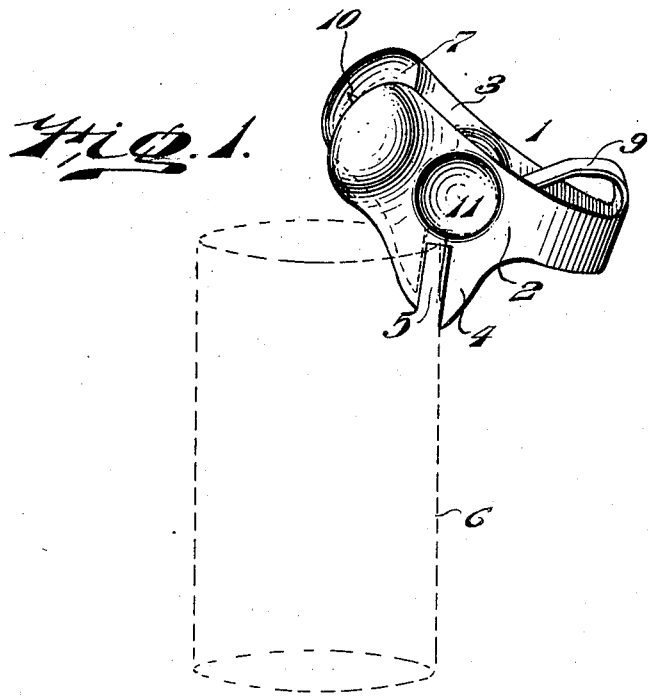
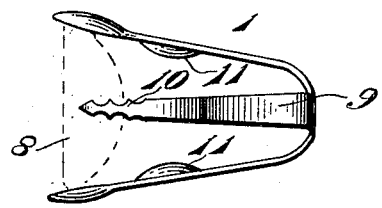
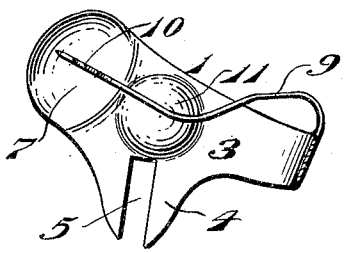
INVENTOR.
Anna L. Gross
BY
Herbert S. Fairbanks
ATTORNEYS.

Patented June 9, 1931

1,809,410

UNITED STATES PATENT OFFICE

ANNA L. GROSS, OF PHILADELPHIA, PENNSYLVANIA

JUICE EXTRACTOR

Application filed April 15, 1929. Serial No. 355,143.

The object of this invention is to devise a novel and simplified construction of a juice extractor which can be constructed as a single piece of sheet material and provide means for retaining in squeezing position a segment of lemon or other fruit so that the juice can be squeezed therefrom without coming into contact with the fingers of the user.

A further object of this invention is to devise a novel juice extractor having means for retaining it in squeezing position on a glass or other container so that the juice which is extracted will fall directly into such container.

With the above and other objects in view, as will hereinafter more clearly appear, my invention comprehends a novel juice extractor.

It further comprehends a novel juice extractor formed from sheet material and preferably from spring metal, having means to secure the part which is to be squeezed in squeezing position.

It further comprehends a novel juice extractor having means to support it upon a glass or other container and having a prong which supports the article to be sequeezed and preferably provided with depressions to receive the thumb and finger of the user.

Other novel features of construction and advantage will hereinafter more clearly appear in the detailed description and the appended claim.

For the purpose of illustrating the invention, I have shown in the accompanying drawings a typical embodiment of it, which, in practice, will give satisfactory and reliable results. It is, however, to be understood that the various instrumentalities of which my invention consists can be variously arranged and organized, and my invention is not limited to the exact arrangement and organization of these instrumentalities, as herein set forth.

Figure 1 is a perspective view of a juice extractor embodying my invention.

Figure 2 is a top plan view thereof.

Figure 3 is a section.

Similar numerals of reference indicate corresponding parts.

Referring to the drawings:—

1 designates a juice extractor embodying my invention which can be made from a single piece of sheet material and preferably of spring metal so that after the squeezing action is affected and the extractor is released it will return to its normal position.

The extractor consists of a single sheet of material which is bent intermediate its ends to form the sides 2 and 3. Each of these sides are provided with a downwardly extending tapered portion 4 having a slot 5 therein which is preferably inclined so that when the extractor is placed on a glass or other container 6 it will assume the position seen in Figure 1. The sides 2 and 3 at their free ends are deflected to form depressions 7 to receive the ends of a segment of fruit 8, shown in dotted lines in Figure 2, such as, for example, a segment of a lemon.

At the central portion of the extractor a prong 9 is formed which is deflected downwardly and forwardly and at its forward end it is preferably pointed and serrated at its sides as at 10 in order that it will more effectively retain the fruit from which the juice is to be extracted in squeezing position.

The sides 2 and 3 at diametrically opposite points are deflected to form depressions 11 for receiving the thumb and a finger of the user and thus providing grasping means whereby the sides can be pressed towards each other.

My present invention is adapted not only to be supported on a glass or other container which is to receive the juice which is extracted, but it is also constructed so that the downwardly projecting portions 4 of the sides will cause the fruit held by the extractor to be supported above the plate or table on which it is placed.

The extractor is preferably made of sheet material of a non-oxidizable character such as, for example, would be the case if it is made of stainless steel or it can be nickeled or plated with chromium or other non-oxidizable material so that it will not be stained by the action of the juices of the fruit with which it is used.

It will be apparent that my present invention can be very economically manufactured since it is preferably formed integral and can be stamped from sheet material by a single operation.

It will now be apparent that I have devised a new and useful juice extractor which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

A juice extractor comprising a piece of sheet material deflected intermediate its ends to form opposed sides and having a fruit receiving prong extending between said sides and each side having a slot opening extending inward from its lower edge to adapt it to be supported on a glass.

ANNA L. GROSS.